(12) United States Patent
Ono

(10) Patent No.: US 6,768,320 B2
(45) Date of Patent: Jul. 27, 2004

(54) METHOD OF REGULATING RESISTANCE VALUE IN SENSOR CIRCUIT

(75) Inventor: Atsushi Ono, Tokyo (JP)

(73) Assignee: Mitsumi Electric Co., Ltd., Tokyo (JP)

(*) Notice: Subject to any disclaimer, the term of this patent is extended or adjusted under 35 U.S.C. 154(b) by 81 days.

(21) Appl. No.: 10/146,953

(22) Filed: May 17, 2002

(65) Prior Publication Data

US 2002/0171440 A1 Nov. 21, 2002

(30) Foreign Application Priority Data

May 21, 2001 (JP) .................................. P2001-150332

(51) Int. Cl.⁷ .................... G01R 27/08; H01C 10/00
(52) U.S. Cl. .................... 324/691; 324/686; 338/195
(58) Field of Search ............................... 324/691, 686, 324/649, 658; 338/195

(56) References Cited

U.S. PATENT DOCUMENTS 4,541,288 A * 9/1985 Kornrumpf et al. ........ 324/209
5,264,798 A * 11/1993 Bey et al. .................. 324/725
5,959,538 A * 9/1999 Schousek ................... 324/691

* cited by examiner

*Primary Examiner*—N. Le
*Assistant Examiner*—Timothy J Dole
(74) *Attorney, Agent, or Firm*—Whitham, Curtis & Christofferson, P.C.

(57) ABSTRACT

In a pressure sensitive sensor circuit, a first conductive path has a first resistor which has a first resistance value and a second conductive path has a second resistor which has a second resistance value lower than the first resistance value of the first resistor and the second resistor is connected to the first resistor in series. A third conductive path has an open circuit which is connected to the second resistor in parallel. The open circuit of the third conductive path is short-circuited when a relationship between input pressure and output level in the pressure sensitive sensor circuit need to regulation of the resistance value in the pressure sensitive sensor.

7 Claims, 3 Drawing Sheets

METHOD OF REGULATING RESISTANCE VALUE IN SENSOR CIRCUIT

BACKGROUND OF THE INVENTION

The present invention relates to a method of regulating a resistance value in a sensor circuit, and more particularly to the method of regulating the resistance value in the sensor circuit for enabling the resistance value in the sensor circuit provided with an electrostatic capacitance sensor or the like to be regulated easily.

Referring to FIGS. 3 to 5, a related method for regulating a resistance value in a sensor circuit of this type will be described. In FIG. 3, a switch device 1 includes a pair of first electrodes 3 mounted on a base plate 2, and a C-shaped second electrode 4 is circumferentially arranged around the first electrodes 3 so as to be outwardly apart therefrom. The first electrodes 3 and the second electrode 4 are covered with a resist 5, and a pair of carbon electrodes 6 are provided on an upper face of the resist 5 and above the first electrodes 3.

Moreover, there is provided a click rubber 7 above and opposed to the first electrodes 3 and the second electrode 4. The click rubber 7 has a substantially cylindrical body 8 and a flexible leg 9 extending downwardly from an outer peripheral part of the cylindrical body 8 at a lower end thereof. In addition, a conductive rubber 10 substantially in a disc-like shape is provided in a center part of the lower end of the cylindrical body 8. The conductive rubber 10, the first electrodes 3 and the second electrode 4 constitute an electrostatic capacitance sensor 13.

Further, a button 11 is mounted on an upper face of the click rubber 7. An upper cover 12 for covering an upper part of the click rubber 7, the first electrodes 3 and the second electrode 4, is provided to press down at a bottom part of the flexible leg 9 of the click rubber 7, so that an upper part of the button 11 projects through an opening 12a which is formed in an upper part of the upper cover 12.

FIG. 4 shows a sensor circuit 14 of the switch device 1. The sensor circuit 14 includes a resistor 16, for setting a resistance constant, which is connected to a line extending from a clock power source 15. The resistor 16 is composed of a high resistance element 17 having a relatively high resistance value and a pre-set variable resistor 18 capable of regulating the resistance value connected in series. The pre-set variable resistor 18 is connected to one of input terminals of an ENOR (Exclusive NOR) gate 19. Then, an end of the electrostatic capacitance sensor 13 is connected to the line between the pre-set variable resistor 18 and the ENOR gate 19. The electrostatic capacitance sensor 13 is composed of a capacitor 20 and a switch 21 connected in series, and the other end of the electrostatic capacitance sensor 13 is grounded.

On the other hand, a resistor 22 for setting a resistance constant is connected to another line extending from the clock power source 15. The resistor 22 is composed of a high resistance element 23 having a relatively high resistance value and a pre-set variable resistor 24 capable of regulating the resistance value connected in series. The pre-set variable resistor 24 is connected to the other input terminal of the ENOR gate 19.

In this state, the capacitor 20 corresponds to a circuit constituted by the conductive rubber 10, the first electrodes 3 and the second electrode 4, while the switch 21 corresponds to a circuit constituted by the conductive rubber 10 and the carbon electrodes 6.

Incidentally, when the button 11 is depressed, the flexible leg 9 of the click rubber 7 is flexed so that the conductive rubber 10 is brought into contact with the carbon electrodes 6 to establish electrical continuity between the carbon electrodes 6. As the button 11 is further pushed down, the conductive rubber 10 is pushed against the first electrodes 3 and the second electrode 4 which are covered with the resist 5. According to the pressure contact, electrostatic capacitance in the conductive rubber 10 is varied so that output from the conductive rubber 10 is thereby changed.

In other words, after the switch 21 has been turned on in the circuit 14, the output at the ENOR gate 19 is changed in accordance with the variation of the electrostatic capacitance of the capacitor 20.

FIG. 5 is a graph showing relationship between input pressure of the electrostatic capacitance sensor 13 provided by bringing the conductive rubber 10 into contact with the resist 5 and the output level thereof. As shown by a solid line, the output level rises substantially in proportion to an increase of the input pressure.

However, as shown by dotted lines in FIG. 5, there exists dispersion in the outputs of the respective electrostatic capacitance sensors 13 with respect to the input. The dispersion may incur instability of the output level of the electrostatic capacitance sensor 13 so that reliability as the electrostatic capacitance sensor 13 may be deteriorated.

Under the circumstances, the dispersion in the output levels has been adjusted by regulating the resistance values of the pre-set variable resistors 18 and 24. However, costs for components of the pre-set variable resistors 18 and 24 are relatively high, and regulation of the resistance values through the use of the pre-set variable resistors 18 and 24 takes a relatively long working time.

SUMMARY OF THE INVENTION

It is therefore an object of the present invention to provide a method and a structure for regulating a resistance value in a sensor circuit in which the resistance value in the sensor circuit can be easily regulated with a low cost.

In order to achieve the above object, according to the present invention, there is provided a method of regulating a resistance value in a pressure sensitive sensor circuit comprising the steps of:

provi ding a pressure sensitive sensor circuit including;
 a first conductive path having a first resistor which has a first resistance value; and
 a second conductive path having a second resistor which has a second resistance value lower than the first resistance value of the first resistor, and the second resistor connected to the first resistor in series; and
 a third conductive path having an open circuit which is connected to the second resistor in parallel;
inspecting a relationship between input pressure and output level in the pressure sensitive sensor circuit; and
short-circuiting the open circuit of the third conductive path based on the result of the inspection.

In the above method, the second resistance value of the second resistor can be decreased by short-circuiting the open circuit of the third conductive path, so that the second resistance value in the pressure sensitive sensor circuit can be easily regulated with a low cost.

According to the present invention, there is also provided a sensor circuit comprising:
 a first resistor having a first resistance value;
 a second resistor having a second resistance value lower than the first resistance value of the first resistor, and connected to the first resistor in series; and an adjuster for regulating a resistance value in the sensor circuit, including a pair of lands separated from each other for a solder joinable distance, and the pair of lands connected to the second resistor in parallel.

In the above structure, the second resistance value of the second resistor can be decreased by short-circuiting the pair of lands, so that the second resistance value in the sensor circuit can be easily regulated with a low cost.

Further, according to the present invention, there is also provided a sensor circuit comprising:

a first resistor having a first resistance value;

a second resistor having a second resistance value lower than the first resistance value of the first resistor, and connected to the first resistor in series; and an adjuster for regulating a resistance value in the sensor circuit, including;

a first land, branched from upstream of the second resistor; and a second land branched from downstream of the second resistor, and separated from the first land for a solder joinable distance.

In the above structure, the second resistance value of the second resistor can be decreased by short-circuiting between the first land and the second land, so that the second resistance value in the sensor circuit can be easily regulated with a low cost.

Further, according to the present invention, there is also provided a sensor circuit comprising:

a first resistor having a first resistance value;

second resistor having a second resistance value lower than the first resistance value of the first resistor, and connected to the first resistor in series; and an adjuster for regulating a resistance value in the sensor circuit, including a closable switch which is connected to the second resistor in parallel.

In the above structure, the second resistance value of the second resistor can be decreased by short-circuiting the switch, so that the second resistance value in the sensor circuit can be easily regulated with a low cost.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Figure 1A:
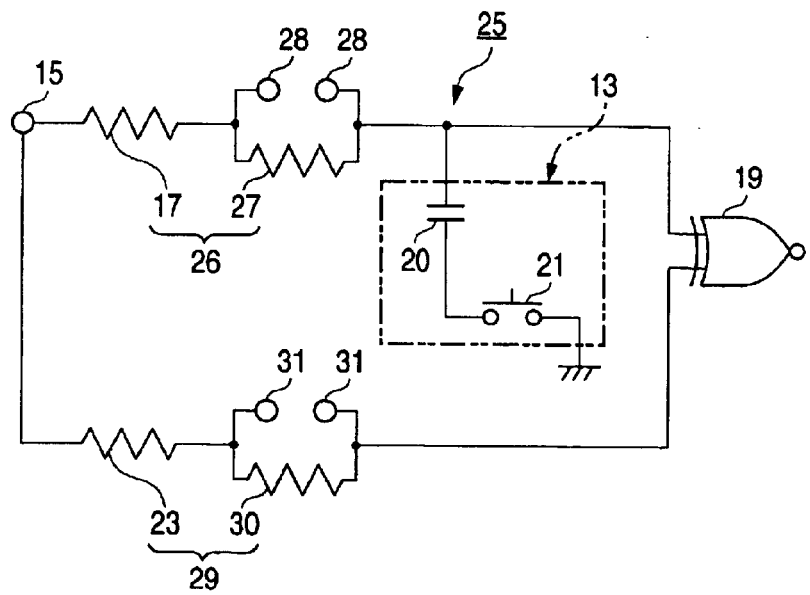
FIG. 1A is a circuit diagram of a switch device according to a first embodiment of the present invention.

Preferred embodiments of the present invention will be described below in detail referring to FIGS. 1 and 2. For convenience of explanation, same components as in the related switch device will be denoted with same reference numerals, and their explanation will be omitted. In FIG. 1A, a sensor circuit 25 of a switch device according to the present invention includes a resistor 26 in place of the resistor 16 of the related device shown in FIG. 4. The resistor 26 is composed of a low resistance element 27 and the high resistance element 17 connected in series, and a pair of lands 28 separated from each other and connected in parallel to the low resistance element 27.

Figure 4:
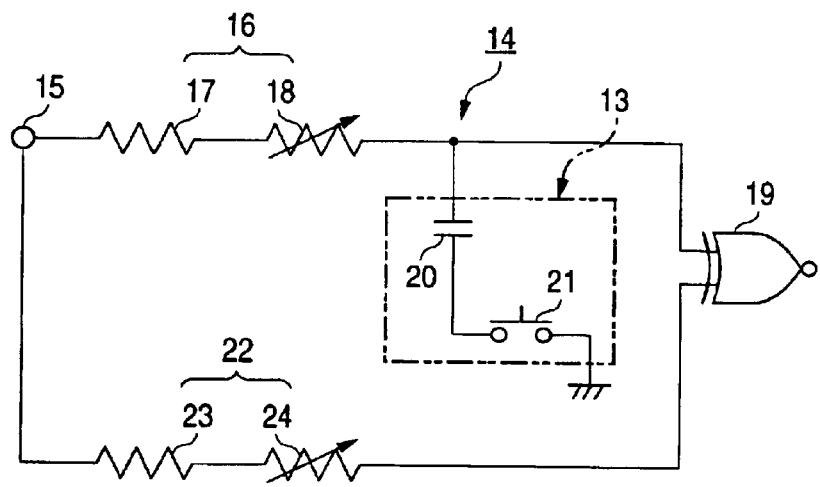
FIG. 4 is a circuit diagram of the related switch device.
Figure 5:
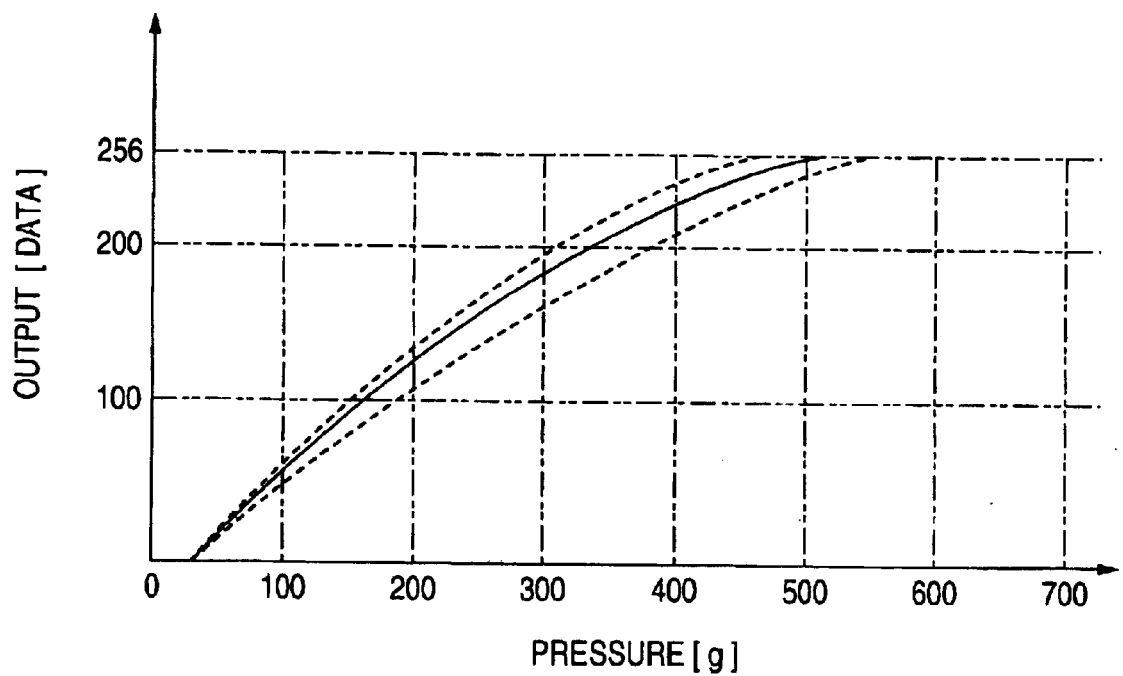
FIG. 5 is a graph showing relationship between input pressure and output level of an electrostatic capacitance sensor in the related switch device.

In addition, a sensor circuit 25 includes a resistor 29 in place of the resistor 22 of the related switch device shown in FIG. 4. The resistor 29 is composed of a low resistance element 30 and the high resistance element 23 connected in series, and a pair of lands 31 separated from each other and connected in parallel to the low resistance element 30.

Figure 1B:
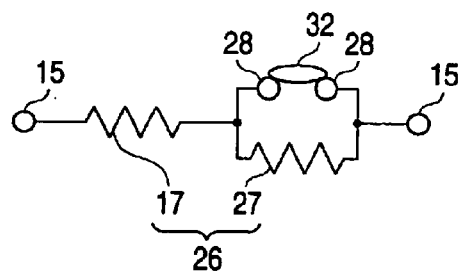
FIG. 1B is a part of the circuit diagram showing a state in which lands in FIG. 1A are short-circuited.

As shown in FIG. 1B, when the lands 28 which are provided in parallel to the low resistance element 27 are caused to short-circuit by solder 32, for example, the circuit composed of the low resistance element 27 and the lands 28 can be short-circuited. Consequently, the resistance value of a circuit composed of the high resistance element 17 and the low resistance element 27 can be decreased by an amount of the resistance value of the low resistance element 27. Specifically, in the case of the resistance value of the high resistance element 17 is R17 and the resistance value of the low resistance element 27 is R27, the total resistance value will be decreased from R17+R27 to R17 by such a short-circuit as described above.

Although not shown in the drawing, when the lands 31 which are provided in parallel to the low resistance element 30 are caused to short-circuit by solder 32 in the same manner, the circuit composed of the low resistance element 30 and the lands 31 can be short-circuited.

In this manner, according to the method and structure for regulating the resistance value in the sensor circuit of the present invention, the resistance value in the sensor can be regulated easily by an inexpensive method.

Moreover, by increasing in number a low resistance elements connected in series to the low resistance element 27 and connected in parallel to corresponding lands 28, or in number low resistance elements connected in series to the low resistance element 30 and connected in parallel to corresponding lands 31, such effects as an extent of the regulation of the resistance value can be enlarged, or more fine regulation of the resistance value can be attained, and so on would be expected.

Figure 2A:
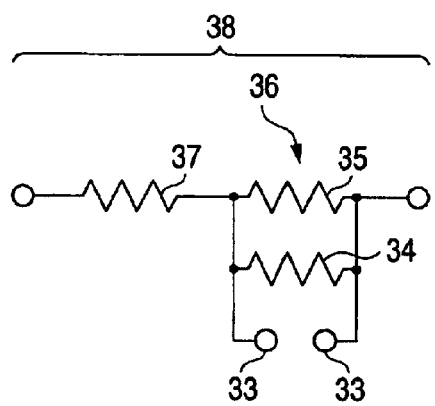
FIG. 2A is a part of a circuit diagram of a switch device according to a second embodiment of the present invention.

FIG. 2A shows the second embodiment of the method for regulating the resistance value in the sensor circuit, a resistor circuit 38 is composed of a high resister 37 and a resister circuit 36 connected in series. The resistor circuit 36 including a pair of separated lands 33, a first low resistance element 34, and a second low resistance element 35 connected in parallel. In the case of a resistance value of the resistor circuit 36 is R36 and a resistance value of the high resistance element 37 is R37, the total resistance value will be R36+R37. Then, in the case of a resistance value of the first low resistance element 34 is R34 and a resistance value of the second low resistance element 35 is R35, the resistance value of the resistor circuit 36 will be $R36=(R34 \cdot R35)/(R35+R34)$, and the total resistance value of the resistor circuit 38 will be $R36+R37=(R34 \cdot R35)/(R35+R34)+R37$.

Figure 2B:
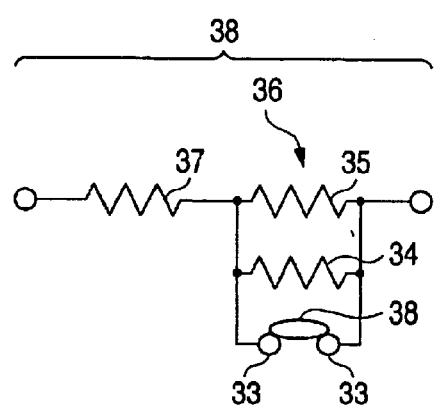
FIG. 2B is a part of the circuit diagram showing a state in which lands in FIG. 2A are short-circuited.
Figure 3:
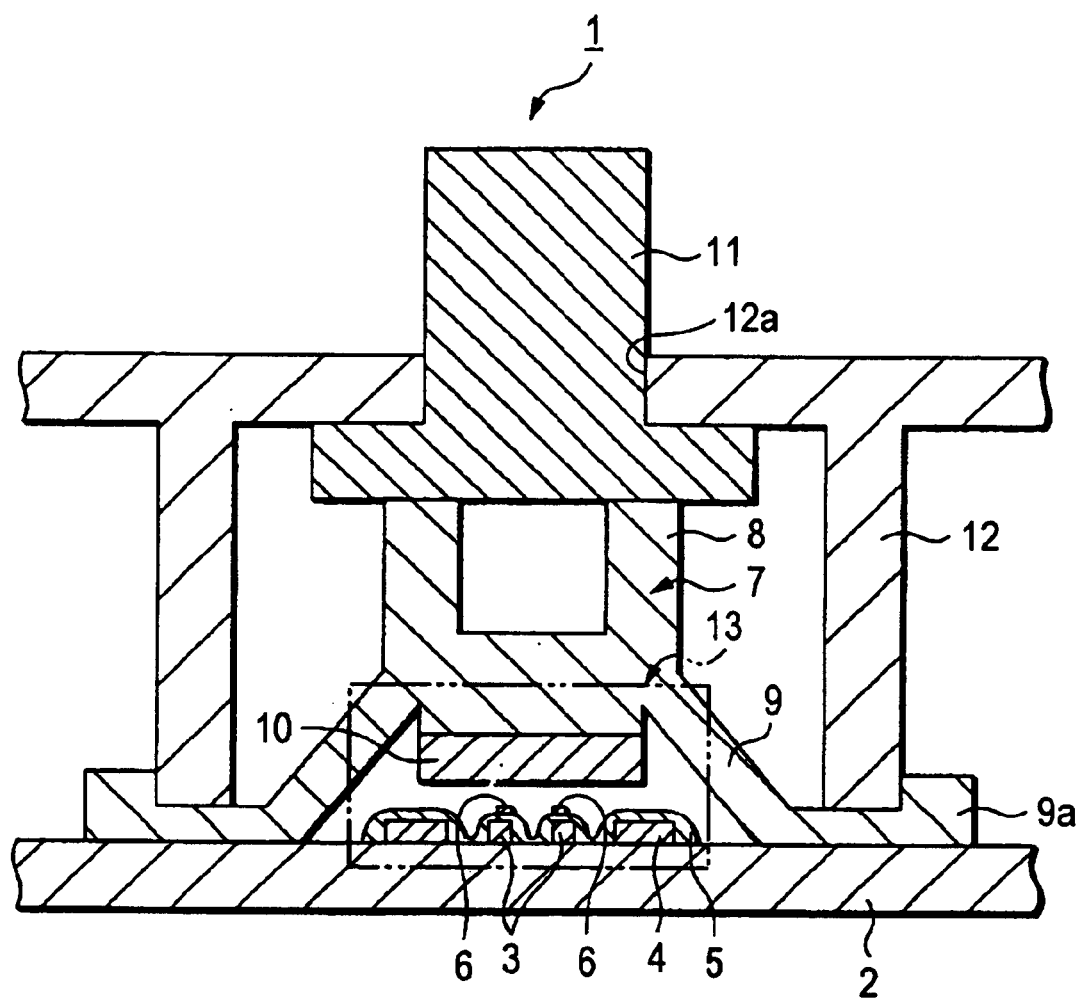
FIG. 3 is a vertical sectional view of a related switch device.

FIG. 2B shows a state in which the resistor circuit 36 in FIG. 2A has been short-circuited by solder 38. In this case, the total resistance value of the resistor circuit 38 will be R37.

In this manner, also according to the method and the structure for regulating the resistance value in the sensor circuit as shown in FIGS. 2A and 2B, the resistance value in the sensor circuit can be regulated easily by an inexpensive method.

Incidentally, it is possible to substitute a closable switch connected to the low resistance element 27 in parallel for the lands 28 in FIGS. 1A and 1B. When the switch is closed, the resistance value of the circuit composed of the high resistance element 17 and low resistance element 27 is decreased by an amount of the resistance value of the low resistance element 27. Hence, similar effects to the lands 28 can be also expected by the switch.

The method for regulating the resistance value in the sensor circuit according to the present invention is not restricted to the sensor circuit 25 of the switch device, but can be applied to all the circuits in which regulation of resistance values is required.

It is also to be noted that various modifications can be made in the present invention unless they deviate from the spirit of the present invention, and it is apparent that the present invention covers also the modifications.

What is claimed is:

1. A method of regulating a resistance value in a pressure sensitive sensor circuit, comprising the steps of:
    providing a pressure sensitive sensor circuit including;
        a first conductive path having a first resistor which has a first resistance value;
        a second conductive path having a second resistor which has a second resistance value lower than the first resistance value of the first resistor, and the second resistor connected to the first resistor in series; and
        a third conductive path having an open circuit which is connected to the second resistor in parallel, said third conductive path including a pair of lands separated from each other by a solder joinable distance, and the pair of lands connected to the second resistor in parallel;
    inspecting a relationship between input pressure and output level in the pressure sensitive sensor circuit; and
    short-circuiting the open circuit of the third conductive path based on the result of the inspection by depositing solder bridging said pair of lands.

2. A sensor circuit comprising:
    a first resistor having a first resistance value;
    a second resistor having a second resistance value lower than the first resistance value of the first resistor, and connected to the first resistor in series; and
    an adjuster for regulating a resistance value in the sensor circuit, including a pair of lands separated from each other by a solder joinable distance, and the pair of lands connected to the second resistor in parallel, said second resistor being short-circuited when solder bridges said pair of lands.

3. The sensor circuit recited in claim 2, further comprising an electrostatic capacitance sensor connected to said second resistor, said electrostatic capacitance sensor being composed of a capacitor and a switch connected in series.

4. A sensor circuit comprising:
    a first resistor having a first resistance value;
    a second resistor having a second resistance value lower than the first resistance value of the first resistor, and connected to the first resistor in series; and
    an adjuster for regulating a resistance value in the sensor circuit, including;
        a first land, branched from upstream of the second resistor; and
        a second land branched from downstream of the second resistor, and separated from the first land by a solder joinable distance, said second resistor being short-circuited when solder bridges said first and second lands.

5. The sensor circuit recited in claim 4, further comprising an electrostatic capacitance sensor connected to said second resistor, said electrostatic capacitance sensor being composed of a capacitor and a 0switch connected in series.

6. A sensor circuit comprising:
    a first resistor having a first resistance value, said first resistor being comprised of a high resistance element having a relatively high resistance value and a low resistance element having a relatively low resistance value, and an adjuster for regulating a resistance value in the sensor circuit, including a pair of lands separated from each other by a solder joinable distance, and the pair of lands connected to the second resistor in parallel, said low resistance element being short-circuited when solder bridges said pair of lands; and
    an electrostatic capacitance sensor connected to said first resistor, said electrostatic capacitance sensor being composed of a capacitor and a switch connected in series.

7. The sensor circuit recited in claim 6, further comprising:
    a second resistor having a second resistance value, said second resistor being comprised of a high resistance element having a relatively high resistance value and a low resistance element having a relatively low resistance value, and an adjuster for regulating a resistance value in the sensor circuit, including a pair of lands separated from each other by a solder joinable distance, and the pair of lands connected to the second resistor in parallel, said low resistance element being short-circuited when solder bridges said pair of lands; and
    a logic device connected to said first and second resistors and providing an output depending on an output of said electrostatic capacitance sensor.

* * * * *